United States Patent [19]
Kato et al.

[11] Patent Number: 6,061,498
[45] Date of Patent: May 9, 2000

[54] ELECTRIC MOTOR CONTROL SYSTEM

[75] Inventors: Yoshihito Kato; Hiromi Hosoda, both of Tokyo, Japan

[73] Assignee: Kabushiki Kaisha Toshiba, Kawasaki, Japan

[21] Appl. No.: 09/204,310

[22] Filed: Dec. 3, 1998

[30] Foreign Application Priority Data

Dec. 4, 1997 [JP] Japan ................................. 9-334626

[51] Int. Cl.$^7$ .................................................. H02P 5/168
[52] U.S. Cl. ..................................... 388/815; 318/568.15
[58] Field of Search ............................ 318/568.15, 561; 388/815

[56] References Cited

U.S. PATENT DOCUMENTS

| | | | |
|---|---|---|---|
| 4,837,486 | 6/1989 | Geens et al. .............................. | 388/811 |
| 4,907,109 | 3/1990 | Senio .................................... | 360/78.04 |
| 4,914,365 | 4/1990 | Murakami et al. ....................... | 318/609 |
| 5,301,174 | 4/1994 | Matoba et al. .......................... | 369/44.28 |

FOREIGN PATENT DOCUMENTS 60-13398  4/1985  Japan .

*Primary Examiner*—Brian Sircus
*Assistant Examiner*—Rina I. Duda
*Attorney, Agent, or Firm*—Finnegan, Henderson, Farabow, Garrett & Dunner, L.L.P.

[57] ABSTRACT

To provide an electric motor control system capable of reducing torque pulsation resulting from an intermittent control and assuring a smooth acceleration/deceleration. In a speed reference signal converter 9, a deviation between a last time value $\omega_{r-1}$ and a this time value $\omega_r$ of the speed reference signal $\omega_r$ of a master control system 1 is computed, the speed reference signal $\omega_r$ from the master control system is converted into a speed reference signal $\omega_r^*$ conforming to the computing cycle of the motor control system according to a ratio between the updating cycle of the speed reference signal from the master control system and a computing cycle in a motor control system and said deviation, a motor driving signal is produced according to this converted speed reference signal $\omega_r^*$ and a motor 6 is driven.

7 Claims, 7 Drawing Sheets

ELECTRIC MOTOR CONTROL SYSTEM

BACKGROUND OF THE INVENTION

1. Field of the Invention

This invention relates to a motor control system, which generates a motor driving signal according to a speed reference signal that is input at regular updating cycles from a master control system, which is an external apparatus.

2. Description of the Related Art

As shown in FIG. 6, a conventional type of motor control system controls the feedback of speed and current. In the motor control system shown in FIG. 6, a speed reference signal ωr* input from a master control system 1 is converted into current references Id*, Iq* by an automatic speed regulator (ASPR) 2. Then the current references Id*, Iq* are converted into voltage references Vd*, Vq* by an automatic current regulator (ACR) 3 and the voltage references Vd*, Vq* output from the automatic current regulator 3 are supplied to a pulse width modulator 4. In the pulse width modulator 4, ON pulse commands Gu, Gv, Gw are generated based on the voltage references Vd*, Vq* and supplied to a power converter 5. In the power converter 5, DC voltage Vdc supplied from a DC power source is converted into desired AC voltage VM by the ON pulse commands Gu, Gv, Gw. A motor (IM) 6 is driven by the desired AC voltage VM supplied from the power converter 5. The speed reference signal $\omega_r^*$ from the master control system 1 is updated at a regular cycle and the speed reference signal $\omega_r^*$ from the master control system 1 is input at every computing cycle of the control system.

In the above construction, the automatic speed regulator 2 has proportion(P) and integration (I) computing function. In the automatic speed regulator 2 when a deviation($W_{rd}$) is produced between the speed reference signal ωr* and a speed ω detected by a speed detector (S.S.) 7, the current references $I_d^*$, Iq* are output to reduce the deviation. Further, the automatic current regulator (ACR)3 also has the proportion(P) and integration(I) computing function. In the automatic current regulator 3 when a deviation is produced between the current references $I_d^*$, $I_q^*$ and the motor currents Id, Iq detected by a current detector 8, the voltage references $V_d^*$, $V_q^*$ are supplied to the power converter 5 via the PWM converter 4 so as to reduce the deviation.

In case of the conventional control system described above, if a response of the motor control system is quick, the speed reference signal becomes the shape of stairs as shown in FIG. 7(a) when the updating cycle $T_M$ of the speed reference signal $\omega_r^*$ input from a master control system 1 is longer than the computing cycle $T_D$ of the motor control system. Therefore, the speed reference signal $\omega_r^*$ current references $I_d^*$, $I_q^*$, voltage references $V_d^*$, $V_q^*$ and furthermore, the motor current I that is supplied to the motor 6 are controlled intermittently as shown in FIG. 7(b) so that they are supplied only when a deviation is produced in the speed reference signal and the torque pulsation will appear as a result. However, it is economically disadvantageous to make the updating cycle of the master control system 1 short in order to suppress it and if the response of the motor control system is made slow, it is not advantageous as the deterioration of efficiency results.

SUMMARY OF THE INVENTION

The present invention has been made in view of above and it is an object to provide a motor control system which is capable of reducing the torque pulsation resulting from the intermittent control and assuring the smooth acceleration and deceleration of a motor.

In order to achieve the object described above, the motor control system of the present invention, which produces a motor driving signal according to a speed reference signal that is input from the master control system at a regular updating cycle, comprising a storage means, which stores a last time value of a speed reference signal of the master control system and a speed reference signal conversion means, which computes a deviation between this stored speed reference signal and a value of this time and converts a speed reference signal from the master control system into a speed reference signal conforming to the computing cycle of the motor control system based on a ratio between the updating cycle of a speed reference signal from the master control system and the computing cycle at the motor control system and the deviation.

According to the present invention, as a deviation between a last time value of the speed reference signal of the master control system and a value of this time is computed and the speed reference signal from the master control system is converted into the speed reference signal conforming to the computing cycle of the motor control system according to a ratio between the updating cycle of the speed reference signal from the master control system and the computing cycle at the motor control system and the deviation, the speed reference signal becomes a shape of fine stairs and thus, it becomes possible to make the motor driving current smooth, reduce the torque pulsation and perform the smooth acceleration/deceleration.

Further, the present invention is characterized in that the speed reference signal conversion means has a deviation limiting means against a deviation of the speed reference signal unique to motor control system, and the deviation limiting means selects a slow speed reference signal with a less deviation by comparing a deviation of the speed reference signal of the master control system with that of the speed reference signal in the motor control system.

Thus, a slow speed reference signal with a less deviation is selected by the deviation limiting means against a deviation of the speed reference signal and therefore, it becomes to suppress the overshoot resulting from a sharp change in the speed reference signal, and possible to limit a mechanical load.

The present invention is characterized in that the speed reference signal conversion means compares a value of last time and a value of this time of the speed reference signal of the master control system, stores the number of computing cycles of the motor control system until the speed reference signal changes, computes a deviation between the value of last time and the value of this time of the speed reference signal of the master control system, divides the deviation by a ratio between the updating cycle of the speed reference signal of the master control system and the computing cycle of the motor control system and adds the result of this division to the value of last time of the speed reference signal in the motor control system.

Thus, the speed reference signal conversion means compares a value of last time of the speed reference signal of the master control system with a value of this time, stores the number of computing cycles until the speed reference signal changes, divides a deviation between the value of last time of the speed reference signal and the value of this time with a ratio between the updating cycle of the speed reference signal and the computing cycle of the control system and adds the result of this division to the value of last time of the speed reference signal of the control system and it is therefore possible to get the updating cycle of the speed reference signal of the master control system, reduce the torque pulsation even when the updating cycle changes and perform the smooth acceleration/deceleration.

Further, in the present invention, if the updating cycle of the speed reference signal from the master control system is indefinite, the speed reference signal conversion means may set a provisional updating cycle of the speed reference signal and produce the speed reference signal at this set provisional updating cycle.

Thus, if the speed reference signal updating cycle from the master control system is indefinite, a provisional updating cycle is set and the speed reference signal is produced at his provisional updating cycle and it is therefore possible to reduce the torque pulsation and perform the smooth acceleration/deceleration.

Further, in the present invention, if the updating cycle of the speed reference signal from the master control system is indefinite, the speed reference signal conversion means may use an immediately before updating cycle as the updating cycle of this time of the master control system and produce the speed reference signal at this updating cycle.

Thus, if the speed reference signal updating cycle from the master control system is indefinite, as the immediately before updating cycle is used as the updating cycle of this time and the speed reference signal is produced at this updating cycle, it is possible to reduce the torque pulsation and perform the smooth acceleration/deceleration.

Further, in the present invention, if the speed reference signal updating cycle from the master control system is indefinite, the speed reference signal conversion means may compute a mean value of the immediately before optional number of updating cycles and using this mean updating cycle of the result of this computation, perform a generation of the the speed reference signal at this updating cycle.

Thus, if the speed reference signal updating cycle from the master control system is indefinite, a mean value of the immediately before optional number of updating cycles is computed and using the updating cycle of the result of this computation as the updating cycle of this time, the speed reference signal is produced at this updating cycle and it is therefore possible to reduce the torque pulsation and the smooth acceleration/deceleration.

Further, in the present invention, if the speed reference signal updating cycle from the master control system is indefinite, the speed reference signal conversion means may use the most short updating cycle out of the immediately before updating cycles as the updating cycle for this time and the speed reference signal may be produced at this updating cycle.

Thus, if the speed reference signal updating cycle from the master control system is indefinite, the most short updating cycle out of the updating cycles for immediately before optional number of cycles is made as the updating cycle for this time and used for generation of the speed reference signal and it is therefore possible to reduce the torque pulsation and perform the smooth acceleration/deceleration.

DETAILED DESCRIPTION OF THE EMBODIMENTS

Hereinafter, a preferred embodiment of the present invention will be described with reference to the attached drawings.

Figure 1:
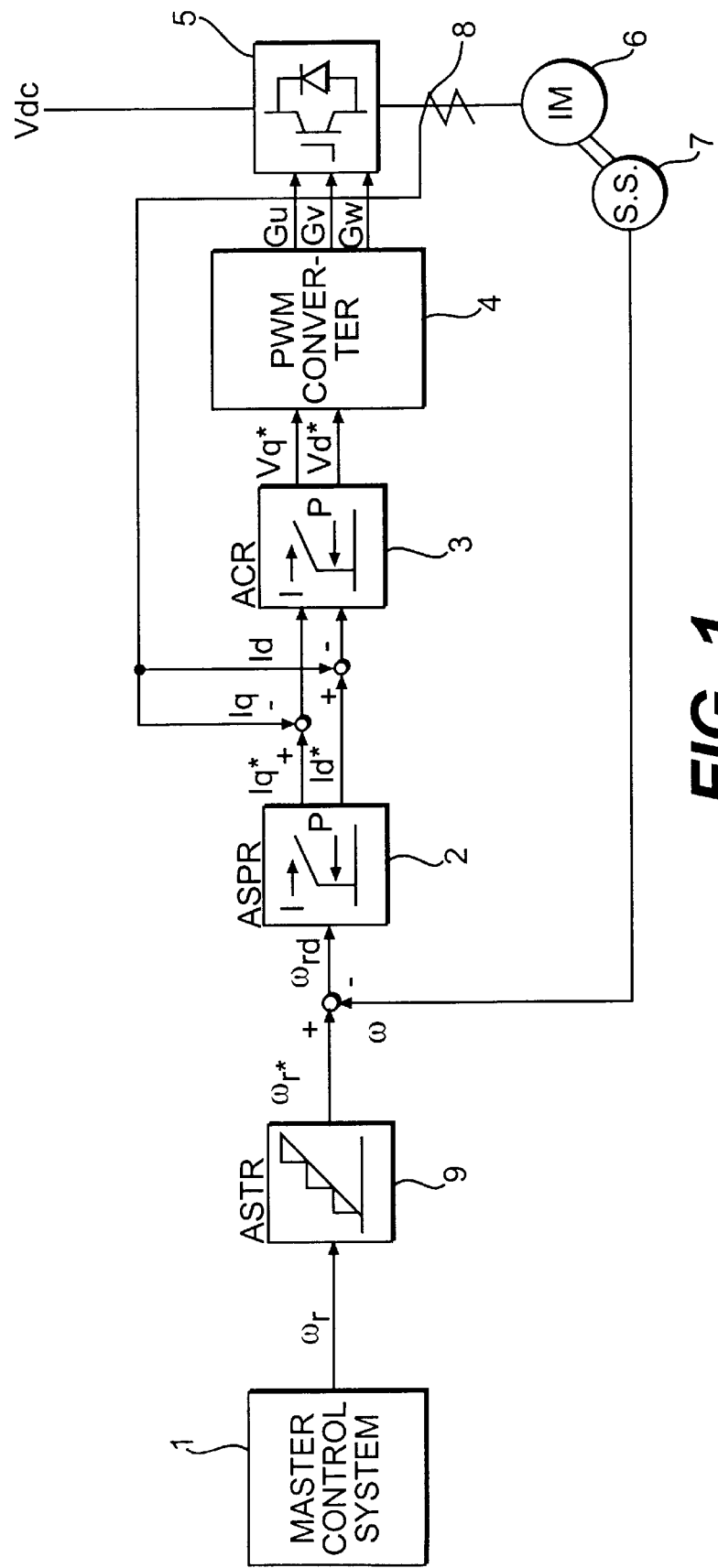
FIG. 1 is a block diagram showing the construction of a motor control system in an embodiment of the present invention.
Figure 6:
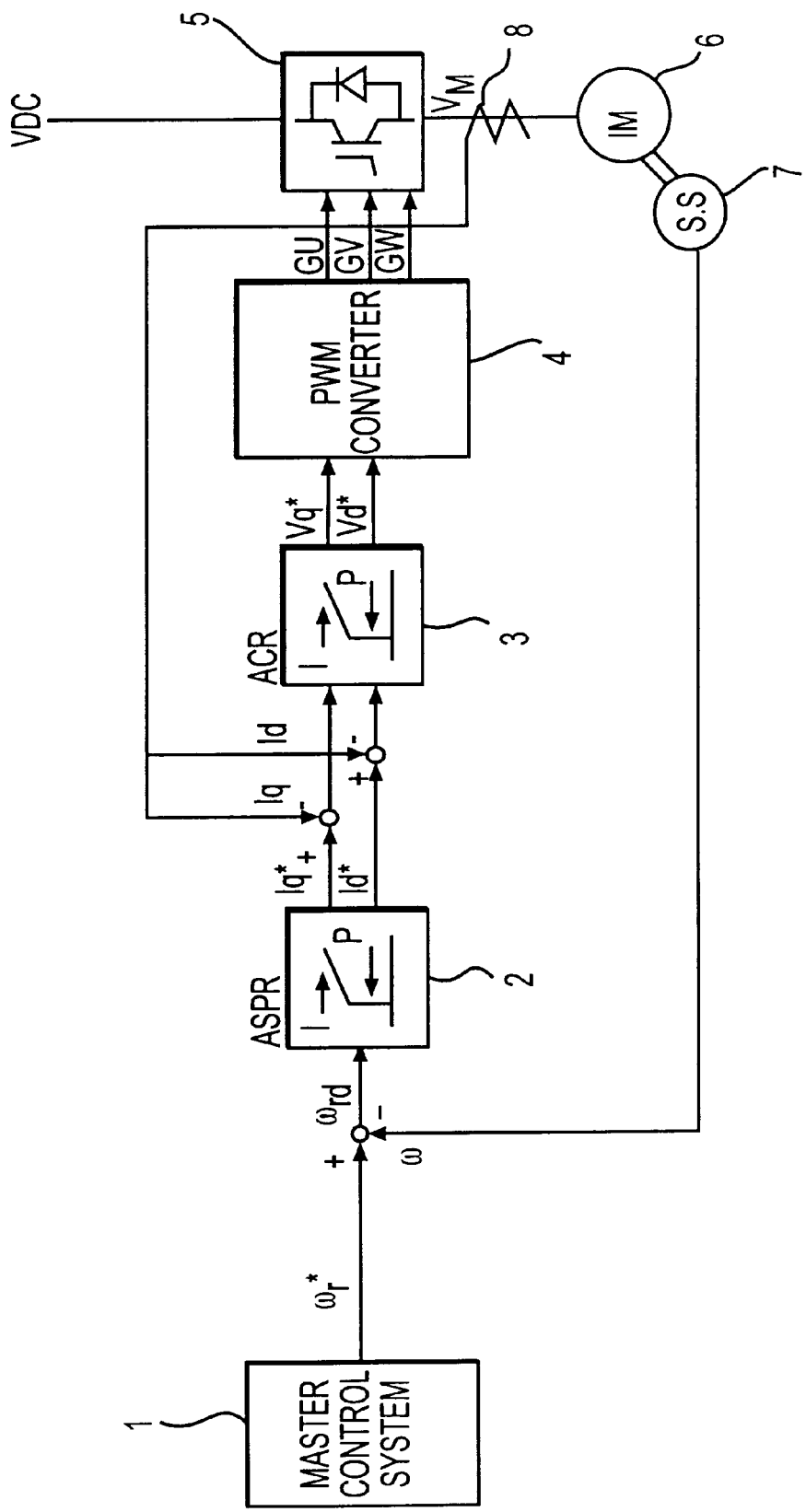
FIG. 6 is a block diagram showing the construction of a conventional motor control system.
Figure 7A:
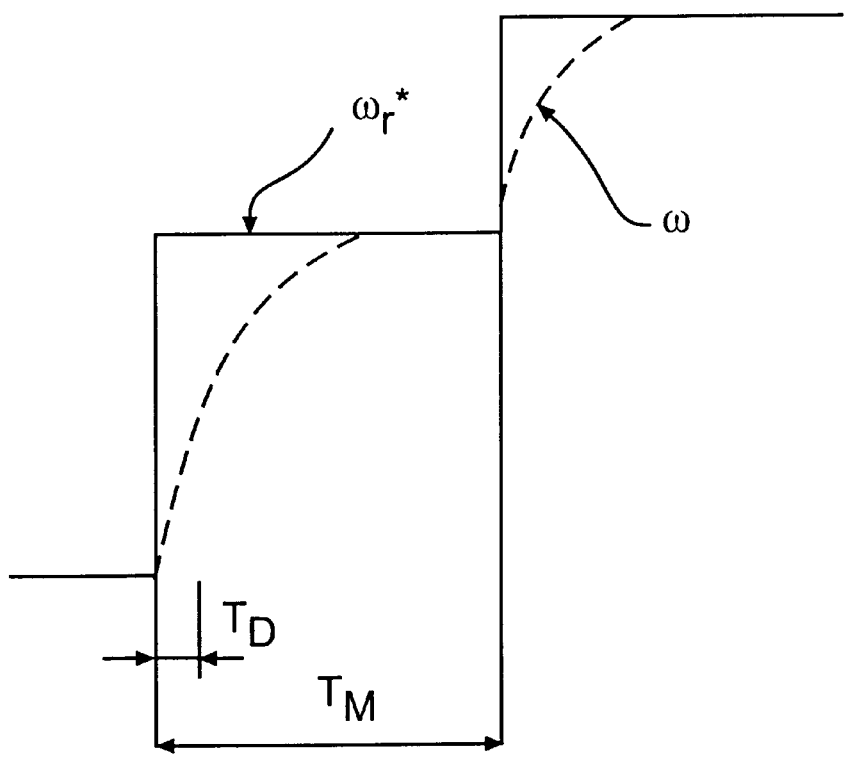
FIGS. 7(a) and (b) are a diagram showing the change of speed reference signal and the motor current in the conventional motor control system.
Figure 7B:
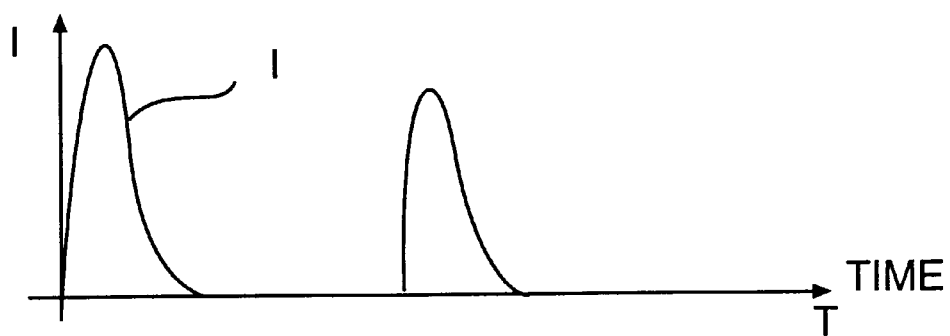

The motor control system shown in FIG. 1 comprises a speed reference signal converter 9 into which a speed reference signal $\omega_r$ is input from a master control system 1 at a definite updating cycle and converted into a speed reference signal $\omega_r^*$ that is conforming to the computing cycle of the motor control system, an automatic speed regulator 2 which converts the speed reference signal from the speed reference signal converter 9 into a current reference signal, an automatic current regulator 3 which converts the current reference signal form the automatic speed regulator 2 into a voltage reference signal, a PWM (Pulse Width Modulation) converter 4, which generates a PWM signal from a voltage signal from the automatic current regulator 3, a power converter 5, which drives a motor 6 by feeding a desired current after converting the PWM signal from the PWM converter 4 into AC voltage for driving the motor, a speed detector 7, which detects and feeds back the rotating speed of the motor 6 in order to get a speed deviation and a current detector 8, which detects current flowing to the motor 6 in order to control the feedback of current. Further, the component elements of this motor control system excluding the speed reference signal converter 9 are the same as those of a conventional motor control system shown in FIG. 6.

Figure 2:
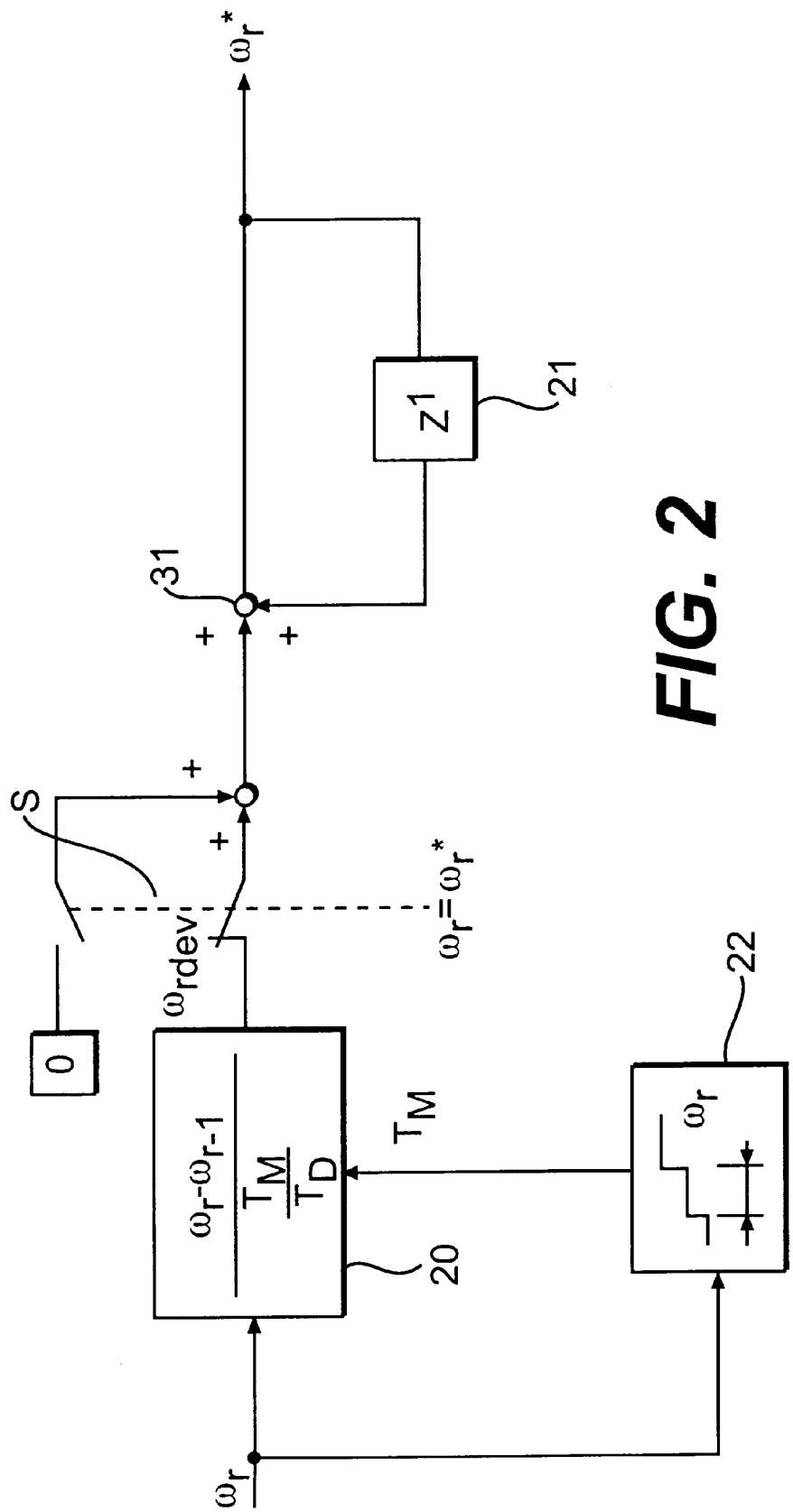
FIG. 2 is a diagram showing the detailed construction of a speed reference signal converter used in the motor control system shown in FIG. 1.

As shown in FIG. 2 in detail, the speed reference signal converter 9 comprises a cyclic computing unit 22 to obtain the updating cycle $T_M$ of the speed reference signal $w_r$ that is input from the master control system 1, a deviation computing unit 20 which has a means to store the last time value $\omega_{r-1}$ of the speed reference signal $\omega_r$ of the master control system 1, and computes a deviation $\omega_r - \omega_{r-1}$ between this last time value $\omega_{r-1}$ and the speed reference signal of this time value $\omega_r$ that is input from the master control system 1, divides the deviation with a ratio between the speed reference signal updating cycle $T_M$ of the master control system obtained by the cyclic computing unit 22 and the computing cycle $T_D$ of the motor control system and outputs the result of this division $\omega_{rdev}$, an integrator 21 which outputs the last time speed reference signal $\omega_{r-1}$ of the motor control system and an adder 31, which switches the result of division that is output from the deviation computing unit 20 at the computing cycle $T_D$ by a switching means S and adds it to the last time speed reference signal $\omega_{r-1}$ of the motor control system that is output from the integrator 21 repeatedly until the speed reference signal $\omega_r^*$ becomes equal to the speed reference signal $\omega_r$ of the master control system 1.

Figure 3A:
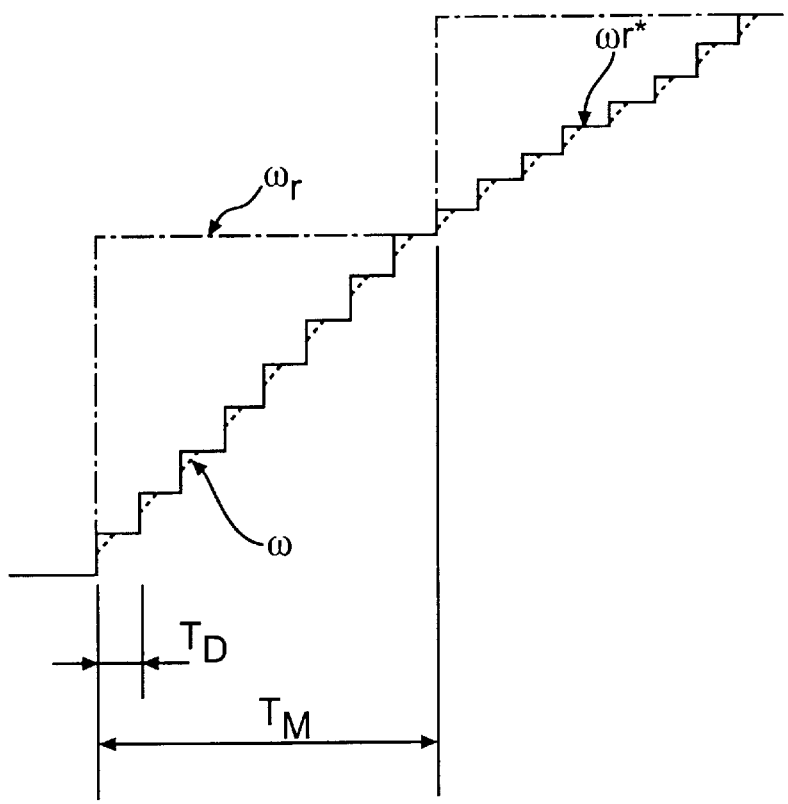
FIGS. 3(a) and (b) are a diagram showing a speed reference signal that are output from the speed reference signal converter shown in FIG. 2 and motor current.
Figure 3B:
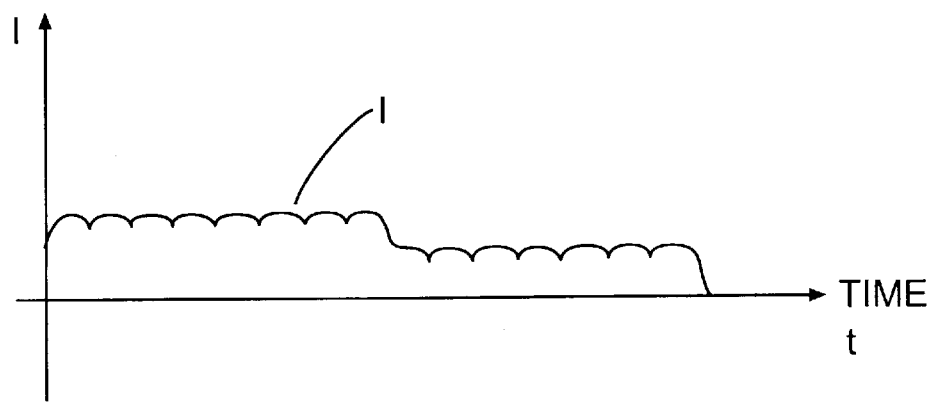

In the motor control system in the construction as described above, a deviation between the speed reference signal $\omega_r$ of the master control system that is updated at a definite cycle and the last time value $\omega_r$ is obtained by the deviation computing unit 20 and this deviation is divided by a ratio between the speed reference signal updating cycle $T_M$ of the master control system and the computing cycle $T_D$ of the motor control system. The result of this division $\omega_{rdev}$ is repetitively added to the last time speed reference signal $\omega_{r-1}$ of the motor control system, that is output from the integrator 21. As this addition is repeated until the speed reference signal $\omega_r^*$ becomes equal to the speed reference signal $\omega_r$ of the master control system, the speed reference signal $\omega_r$ of the master control system is converted to fine stairs reference signal $\omega_r^*$ conforming to the computing interval of the motor control system as shown in FIG. 3(*a*) and the motor current I is supplied from the power converter 5 as shown in FIG. 3(*b*), the motor 6 is accelerated/decelerated like the motor speed $\omega$. Thus, the torque pulsation is suppressed and the linear and smooth control becomes possible.

In case of a system comprising, for instance, the master control system 1 having the updating cycle of 20 msec. and the control system of the motor 6 having the computing cycle of 1 msec. and a last time value of the speed reference signal is 500 rpm and a value of this time is 600 rpm, the speed reference signal is added to the last time value of 500 rpm by 5 rpm at a time for one updating cycle of the master control system every computing cycle for 20 times based on the speed reference signal converter 9 and thus, the linear acceleration/deceleration becomes possible and the motor current flow more even than before. The speed control response of the motor control system against the speed reference signal $\omega_r$ of the master control system 1 is generally slow and the computing cycle $T_D$ of the motor control system is sufficiently shorter than the speed reference signal updating cycle $T_M$ and it is therefore possible to produce a smooth speed reference signal by providing the speed reference signal converter 9 as described above.

Figure 4:
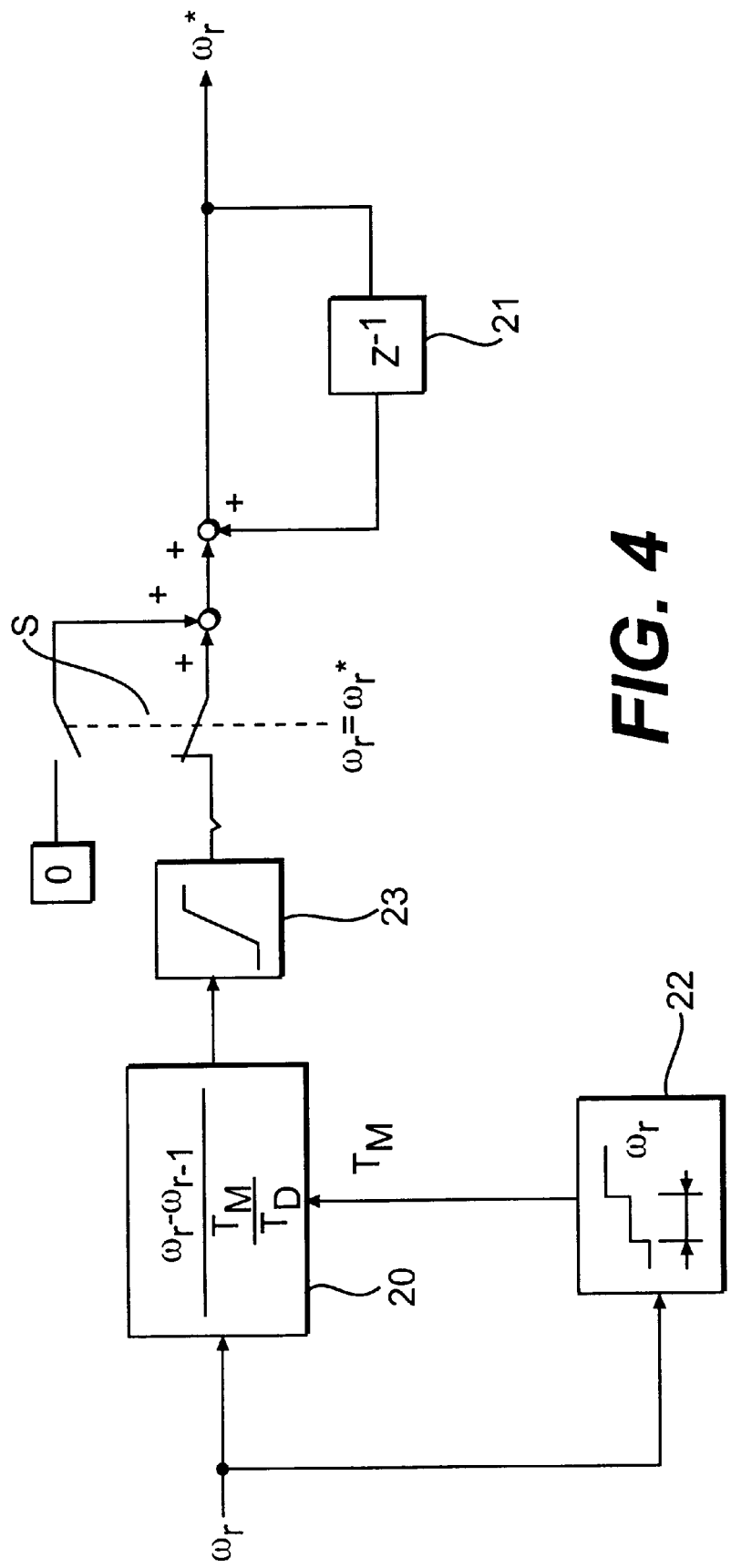
FIG. 4 is a diagram showing the construction with a deviation limiter added to the speed reference signal converter shown in FIG. 2.

In the above construction, when a deviation limiter 23 for the deviation of the speed reference signal is provided to the speed reference signal converter 9 as shown in FIG. 4 so as to select a gentle value with less deviation by the deviation limiter 23 by comparing a deviation ($\omega_r-\omega_{r-1}$) of the speed reference signal $\omega_r$ with a deviation of the speed reference signal in the motor control system, it is possible to operate a motor without giving a high load to it.

Further, in the above construction, a cyclic computing unit 22 stores the number of speed computing cycles $N_D$ of the motor control system until the speed reference signal $\omega_r$ of the master control system becomes equal to the speed reference signal $\omega_r^*$ of the speed reference signal converter 9 and is possible to acquire a value obtained by multiplying the computing cycle $T_D$ in the motor control system to the number of computing cycles $N_D$ as the updating cycle $T_M$.

Further, in the above construction, when the speed reference signal $\omega_r$ is input at an indefinite updating cycle from the master control system, a provisional updating cycle $T_{MD}$ of the speed reference signal at the master control system side is stored in the motor control system, a desired speed reference signal $\omega_r^*$ is computed by the speed reference signal converter 9 regarding the provisional updating cycle $T_{MD}$ as the updating cycle of this time and the speed reference signal $\omega_r^*$ that will reach the speed reference signal $\omega_r$ of the master control system within the provisional updating cycle $T_{MD}$ is produced. Thus, even the case that the updating cycle from the master control system is indefinite, the smooth speed reference signal is possible to produce. At this time, the provisional updating cycle $T_{MD}$ should be sufficiently longer than the computing cycle $T_D$ of the motor control system.

Figure 5:
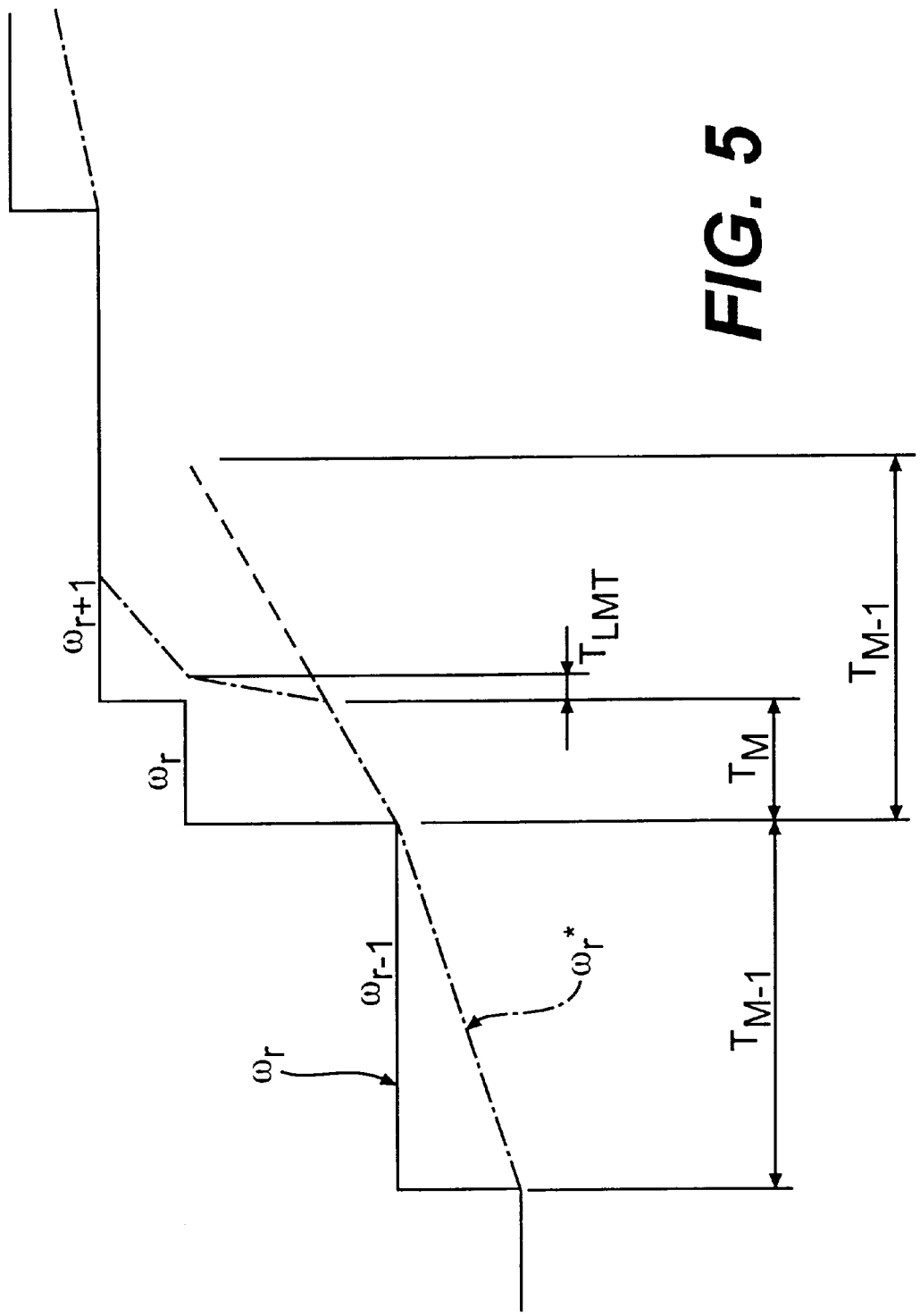
FIG. 5 is a diagram showing the speed reference signal $\omega_r^*$ of the motor control system and the speed reference signal $\omega_r$ of the master control system that are produced at a provisional updating cycle by setting the provisional updating cycle of the speed reference signal when the updating cycle of the speed reference signal from the master control system is indefinite.

Further, in the above construction, when the speed reference signal $\omega_r$ is input at an indefinite cycle from the master control system, a means is provided to obtain and store the last time updating cycle $T_{M-1}$ of the master control system by the cyclic computing unit 22 and the speed reference signal $\omega_r^*$ which will reach the speed reference signal $\omega_r$ within the updating cycle $T_{M-1}$ is produced by the speed reference signal converter 9 by regarding this last time updating cycle $T_{m-1}$ as the updating cycle of this time as shown in FIG. 5. However, if the speed reference signal $\omega_r$ is updated before reaching the speed of the speed reference signal $\omega_r$ of the master control system, a motor is accelerated or decelerated up to or down to the speed reference signal $\omega_r$ of the master control system, which is an objective speed according to a value of the deviation limiter 23. At this time, a time $T_{LMT}$ operated by the deviation limiter 23 is deducted from the updating cycle $T_M$ and from the result of this computation, the updating cycle $T_D$ of the motor control system and the speed reference signal $\omega_{r30\ 1}$ the speed reference signal $\omega_r^*$ of the motor control system is produced conforming to the speed reference signal $\omega_r$ of the master control system likewise the above, a compensation control is performed so as to reach the objective speed reference signal $\omega r_{r+1}$ within the updating cycle $T_M$. Thus, when the updating cycle of the master control system is indefinite, it becomes possible to produce a speed reference following that change and also, to suppress the torque pulsation within the satisfactory range as a motor control response.

Further, in the above construction, if the speed reference signal $\omega_r$ of the master control system is input at an indefinite cycle, a cyclic computing unit 22 which computes and stores the updating cycles of optional times immediately before is provided and a mean updating cycle $T_{MM}$ is computed by dividing an added result $\Sigma T_M$ of optional number of updating cycles by that optional number of cycles and the reference signal $\omega_r^*$ of the motor control system is produced at a ratio conforming to the master control system speed reference signal $\omega_r$ likewise the above from the updating cycle $T_D$ and the speed reference signal $\omega_{r+1}$ of the motor control system. However, when the speed reference signal of the master control system is updated before reaching an objective speed, it is so controlled as to reach a new speed reference signal $\omega_{r+1}$ of the master control system with in a new mean updating cycle $T_{MM+1}$ by performing the speed reference compensation likewise above.

Further, in the above construction, if the speed reference signal $\omega_r$ of the master control system is updated at an indefinite cycle, the speed reference signal $\omega_r^*$ in the motor control system is computed likewise above regarding the most short cycle $T_{MS}$ out of the number of optional updating cycles immediately before as the updating cycle of this time. Thus, a smooth speed reference signal can be produced similarly.

The embodiment of the present invention described above is applicable to any power conversion system which drives a motor.

Further, the motor control system of the present invention is applicable not only to IGBT inverters but also to various kinds of control systems such as cyclo-converter, thyristor-converter, etc.

As described above, according to the preset invention, a deviation between a last time value of a speed reference signal from the master control system and a value of this time is computed and a speed reference signal of the master control system is converted into a speed reference signal conforming to the computing cycle of the motor control system based on a ratio between the updating cycle of a speed reference signal of the master control system and the computing cycle of the motor control system and the deviation, the speed reference signal becomes a smooth signal and as a result, it becomes possible to make a motor driving current smooth, reduce the torque pulsation and perform a smooth acceleration/deceleration and construct a stabilized control system.

Further, as a deviation limiting means is provided for a deviation of speed reference signal and a gentle speed reference signal with less deviation is selected by comparing a deviation of the speed reference signal of the master control system with a deviation of the speed reference signal in the motor control system, it is possible to suppress overshoot resulting from a steep change and limit a mechanical load.

Further, as the speed reference signal conversion means compares a last time value of the speed reference signal of the master control system and a value of this time, stores the number of computing cycles until the speed reference signal changes, divides a deviation between the last time value of the speed reference signal and a value of this time by a ratio between the speed reference signal updating cycle and the computing cycle of the motor control system and adds the result of this division to the last time value of the speed reference signal of the motor control system, the speed reference signal updating cycle of the master control system can be acquired and it is possible to reduce the torque pulsation and make a smooth acceleration/deceleration even when the updating cycle is changed.

Further, if the updating cycle of the speed reference signal from the master control system is indefinite, a provisional updating cycle may be set and a speed reference signal may be produced at this provisional updating cycle or using the immediately before updating cycle as the updating cycle of this time and a speed reference signal may be produced at this updating cycle.

Further, if the updating cycle of the speed reference signal from the master control system is indefinite, a mean value of the updating cycles for the immediately before number of updating cycles is computed and using the updating cycle that is the result of this computation as an updating cycle of this time, a speed reference signal may be produced at this updating cycle or using the most short updating cycle out of immediately before any number of updating cycles as an updating cycle of this time, a speed reference signal may be produced at this updating cycle. According to any construction, it is possible to reduce the torque pulsation and make a smooth acceleration/deceleration.

What is claimed is:

1. An electric motor control system, which generates a motor driving signal according to a speed reference signal that is input from a master control system at a certain updating cycle, comprising a storage means for storing a last time value of a speed reference signal of the master control system; and a speed reference signal conversion means for computing a deviation between this stored last time value and a value of this time, and converting a speed reference signal from the master control system into a speed reference signal conforming to the computing cycle of the motor control system according to a ratio between the updating cycle of the speed reference signal from the master control system and a computing cycle in a motor control system and the deviation.

2. An electric motor control system according to claim 1, characterized in that the speed reference signal conversion means comprises a deviation limiting means for limiting a deviation of a speed reference signal unique to the motor control system to compare the deviation of the speed reference signal of the master control system with a deviation of the speed reference signal in the motor control system, and to select a slow speed reference signal with less deviation.

3. An electric motor control system according to claim 1, characterized in that the speed reference signal conversion means compares a last time value of a speed reference signal of the master control system with a value of this time, stores the number of computing cycles of the motor control system until the speed reference signal changes, computes a deviation between a last time value and a value of this time of a speed reference signal of the master control system, divides the deviation with a ratio between the updating cycle of a speed reference signal of the master control system and the computing cycle of the motor control system, and adds the result of this division to a last time value of a speed reference signal in the motor control system.

4. An electric motor control system according to claim 1, characterized in that the speed reference signal conversion means sets a provisional updating cycle of the speed reference signal when the updating cycle of the speed reference signal from the master control system is indefinite, and generates the speed reference signal at this set provisional updating cycle.

5. An electric motor control system according to claim 1, characterized in that when the speed reference signal updating cycle from the master control system is indefinite, the speed reference signal conversion means generates the speed reference signal using the immediately before updating cycle as the current updating cycle of the master control system.

6. An electric motor control system according to claim 1, characterized in that when the speed reference signal updating cycle from the master control system is indefinite, the speed reference signal conversion means computes an average of the updating cycles of the immediately before optional number of cycles, and produces the speed reference signal at this updating cycle by using the average of the updating cycle as the updating cycle of the current time.

7. An electric motor control system according to claim 1, characterized in that when the speed reference signal updating cycle from the master control system is indefinite, the speed reference signal conversion means produces the speed reference signal using the most short updating cycle out of the immediately before updating cycles of optional number of updating cycles as the updating cycle of this time.

* * * * *